United States Patent
Blough

(10) Patent No.: US 8,992,333 B2
(45) Date of Patent: Mar. 31, 2015

(54) FOLDOVER TAB FOR RETAINER SPRING STOP

(71) Applicant: Schaeffler Technologies AG & Co. KG, Herzogenaurach (DE)

(72) Inventor: Gregory Blough, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/898,981

(22) Filed: May 21, 2013

(65) Prior Publication Data

US 2013/0324267 A1    Dec. 5, 2013

Related U.S. Application Data

(60) Provisional application No. 61/653,135, filed on May 30, 2012.

(51) Int. Cl.
    *F16F 15/121*    (2006.01)
    *F16F 15/123*    (2006.01)

(52) U.S. Cl.
    CPC ......... *F16F 15/1213* (2013.01); *F16F 15/1232* (2013.01)
    USPC ...................................... 464/68.92; 464/67.1

(58) Field of Classification Search
    USPC ........... 464/66.1, 67.1, 68.8–68.92; 192/3.29, 192/203, 205
    See application file for complete search history.

(56) References Cited

U.S. PATENT DOCUMENTS

| | | | |
|---|---|---|---|
| 4,903,803 A * | 2/1990 | Koshimo | ................ 192/205 X |
| 6,290,042 B1 | 9/2001 | Breier | |
| 7,207,888 B2 * | 4/2007 | Verhoog et al. | ............. 464/67.1 |
| 7,585,226 B2 | 9/2009 | Uhler et al. | |
| 7,717,242 B2 | 5/2010 | Schrader et al. | |
| 7,753,183 B2 | 7/2010 | Parks et al. | |

* cited by examiner

*Primary Examiner* — Gregory Binda
(74) *Attorney, Agent, or Firm* — Simpson & Simpson, PLLC

(57) ABSTRACT

A vibration damper, including a cover plate with an annular portion, and a spring portion including spring retaining portions forming respective spaces and a spring blocking portions including respective protrusion segments and respective tab segments including respective portions of an edge of the cover plate and having a same first thickness. The damper includes springs at least partially located in the respective spaces, and having respective longitudinal ends, and a second cover plate or output flange connected to the cover plate. The springs are arranged to transmit torque to the cover plate. The respective protrusion segments have a same second thickness and include respective protrusions. Respective first portions of the longitudinal ends of the springs are engaged with the respective protrusions. Respective second portions of the longitudinal ends of the springs are engaged with the respective tab segments.

8 Claims, 7 Drawing Sheets

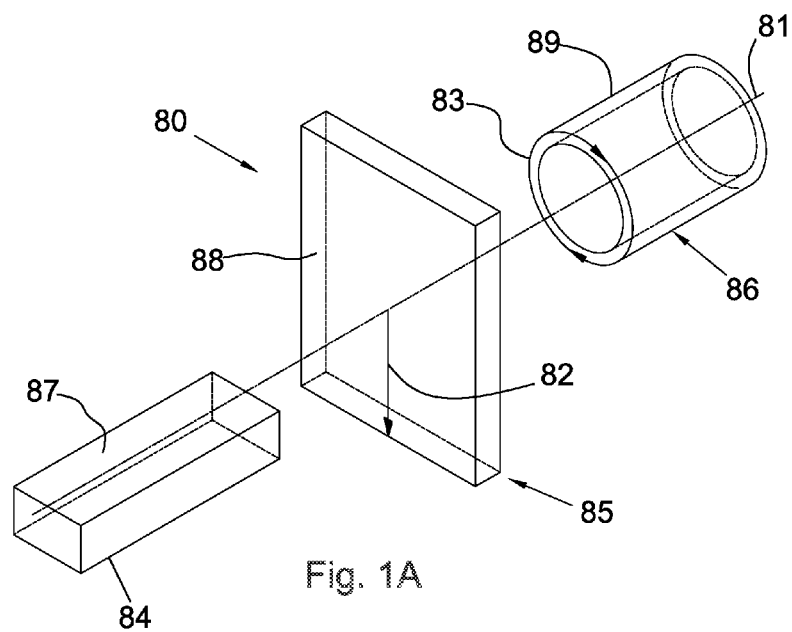
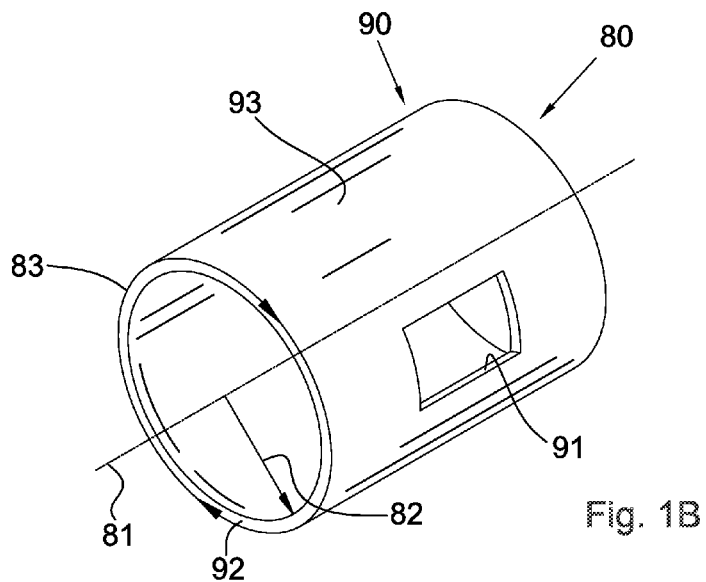

FOLDOVER TAB FOR RETAINER SPRING STOP

CROSS-REFERENCE TO RELATED APPLICATIONS

This application claims the benefit under 35 U.S.C. §119 (e) of U.S. Provisional Patent Application No. 61/653,135 filed May 30, 2012.

TECHNICAL FIELD

The present disclosure relates to a spring retaining configuration for a cover in a vibration damper, in particular, a tab for engaging springs ends formed by folding a portion of the cover.

BACKGROUND

FIG. 6 is a partial cross-sectional view of a prior art torque converter and vibration damper. Torque converter 200 includes cover 202 arranged to receive torque, vibration damper 204, torque converter clutch 206, and output 208. The vibration damper includes input component 210, at least one spring 212, and cover plate 214. The damper also includes cover plate 216 fixedly secured to cover plate 214, at least one spring 218, and flange 220 forming output 208. The at least one spring 218 is engaged with cover plates 214 and 216, and the flange. The input component is connected to the torque converter clutch. The clutch is controllable to connect and disconnect the cover to and from the vibration damper. Springs 212 are engaged with the input component and cover plate 214 and are arranged to receive torque from the input and transmit the torque to cover plate 214. Cover plates 214 and 216 are arranged to transmit torque from springs 212 to the at least one spring 218, which in turn transmits the torque to the flange and output. As is known in the art, the input component and cover plates 214 and 216 are partially rotatable with respect to each other via springs 212, and cover plates 214 and 216 are partially rotatable with respect to the flange via the at least one spring 218.

The at least one spring 212 is located in a respective space 222 formed by curved portion 224 of plate 212. Portion 224 retains the spring except for in circumferential direction CD into the page. To constrain spring 212 in direction CD, for example, to enable the transfer of torque to spring 212 from the input component, protrusions 226 are formed on plate 214 such that longitudinal ends of the spring are engaged with the protrusions. However, since sufficient room for the input component must be provided in space 222, the size of the protrusions is limited. As a result, protrusions 226 are only large enough to enable a relatively small portion of the longitudinal ends to engage the protrusions, for example, portions 212A are free of engagement with the protrusions. Due to this small portion of engagement, compression of spring 212 in direction CD can cause buckling of spring 212 or even cause spring 212 to disengage with the protrusions, both of which adversely affect operation of the vibration damper.

SUMMARY

According to aspects illustrated herein, there is provided a vibration damper, including a first cover plate with an annular portion, and a spring portion located radially outward of the annular portion and including a plurality of spring retaining portions forming respective spaces and a plurality of spring blocking portions including respective protrusion segments and respective tab segments including respective portions of an edge of the first cover plate and having a same first thickness. The damper includes a first plurality of springs at least partially located in the respective spaces, and having respective longitudinal ends with respect to a circumferential line passing through respective longitudinal axes for the plurality of springs. The first plurality of springs is arranged to transmit torque to the first cover plate. The respective protrusion segments have a same second thickness and include respective protrusions extending toward the circumferential line. Respective first portions of the longitudinal ends of the first plurality of springs are engaged with the respective protrusions. Respective second portions of the longitudinal ends of the first plurality of springs are engaged with the respective tab segments.

According to aspects illustrated herein, there is provided a torque converter, including a cover arranged to receive torque and a vibration damper including: a first cover plate including an annular portion and a spring portion located radially outward of the annular portion and including a plurality of spring retaining portions forming respective spaces and a plurality of spring blocking portions including respective protrusion segments and respective tab segments including respective portions of an edge of the first cover plate and having a same first thickness. The damper includes an output and a plurality of springs at least partially located in the respective spaces, and having respective longitudinal ends with respect to a circumferential line passing through respective longitudinal axes for the plurality of springs and connected to the first cover plate. The first cover plate is arranged to transmit torque to the output. The respective protrusion segments have a same second thickness and include respective protrusions extending toward the circumferential line. Respective first portions of the longitudinal ends of the springs are engaged with the respective protrusions. Respective second portions of the longitudinal ends of the springs are engaged with the respective second segments.

According to aspects illustrated herein, there is provided a method of forming a vibration damper, including: stamping a sheet of steel to form a blank for a first cover, the blank including a first portion extending from a center of the disc to a first radial distance from the center and forming first respective portions of an outer circumference for the blank and a plurality of second portions extending to a second radial distance, greater than the first radial distance, from the center and forming second respective portions of the outer circumference; folding the plurality of second portions to overlap the first portion; compressing the plurality of second portions against the first portion to form a plurality of tab segments; curving a radially outermost segment of the first portion to form a plurality of spring blocking portions including the plurality of protrusions and the plurality of tab portions and a circumferentially extending space including a plurality of spring retaining spaces separated by respective spring blocking portions; and forming a plurality of protrusions between respective tab segments and the center of the blank.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application; and, FIG. 2 is a partial cross-sectional view of a torque converter with a vibration damper with a tab spring blocking feature;

DETAILED DESCRIPTION

Figure 2:
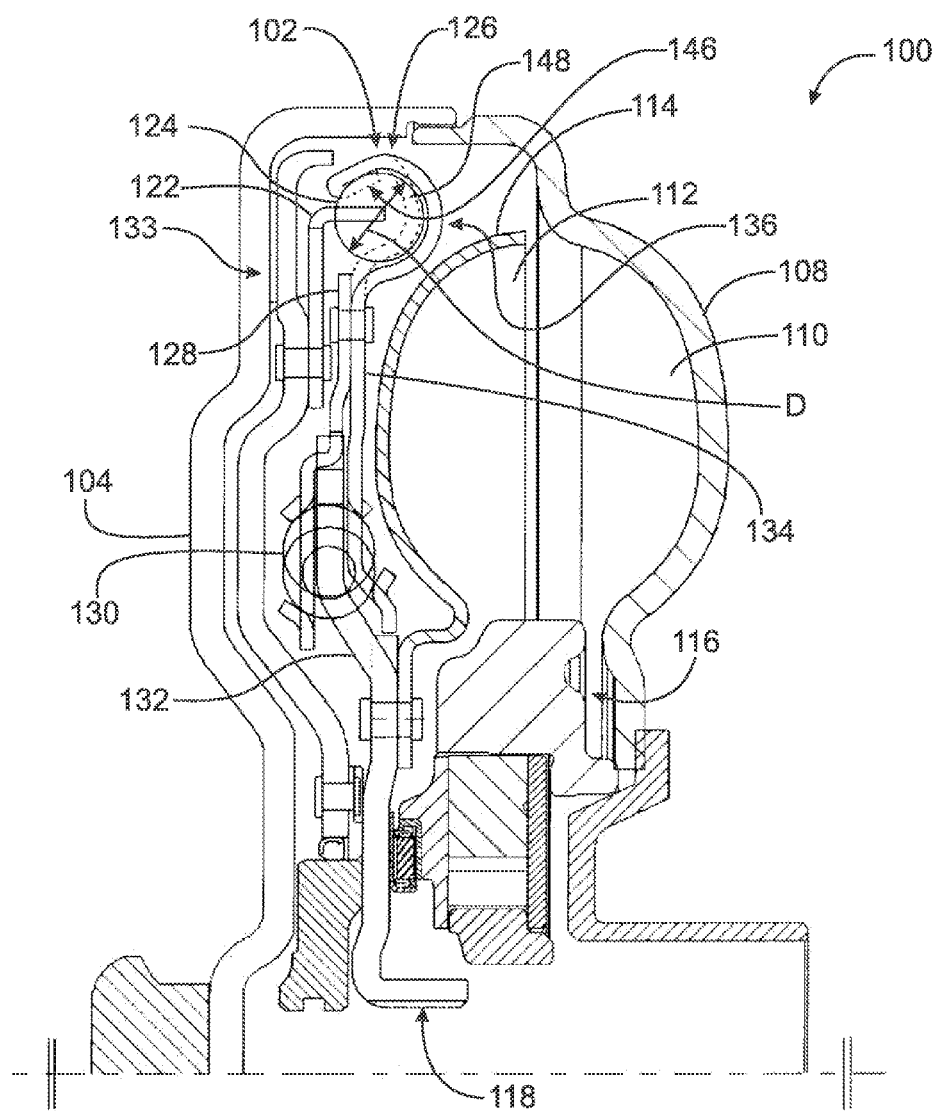

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is a partial cross-sectional view of torque converter 100 with vibration damper 102 with a tab spring blocking feature. Torque converter 100 includes cover 104, arranged to receive torque, and pump shell 108, for pump 110, fixedly secured to the cover. By fixedly secured we mean that no relative motion is possible between the cover and the pump shell. The torque converter also includes turbine 112 hydraulically coupled to the pump, turbine shell 114, stator 116, and output 118 arranged to transmit torque from the torque converter.

Vibration damper 102 includes input component 122, plurality of springs 124, and cover plate 126. In an example embodiment, the damper includes cover plate 128 fixedly secured to cover plate 126, at least one spring 130, and flange 132 forming output 118. The at least one spring 130 is engaged with cover plates 126 and 128 and the flange. Springs 124 are engaged with the input component and cover plate 126 and are arranged to receive torque from the input component and transmit the torque to cover plate 126. Cover plates 126 and 128 are arranged to transmit torque from springs 124 to the at least one spring 130, which in turn transmits the torque to the flange and output. As is known in the art, the input component and cover plates 126 and 128 are partially rotatable with respect to each other via springs 124, and cover plates 126 and 128 are partially rotatable with respect to the flange via the at least one spring 130.

In an example embodiment, the torque converter includes torque converter clutch 133 and the input component is connected to the clutch. The clutch is controllable to connect and disconnect the cover to and from the vibration damper.

Figure 3:
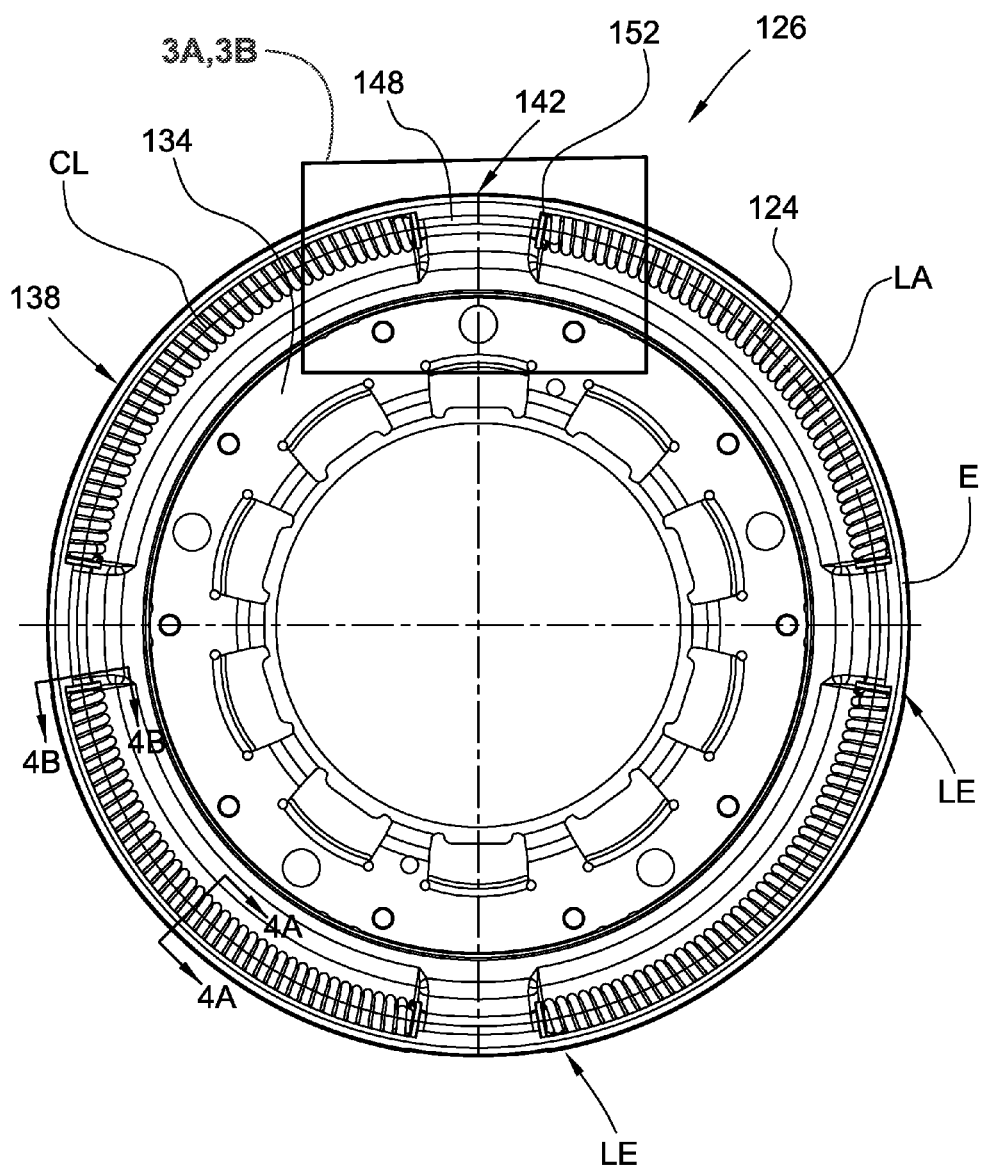
FIG. 3 is a front view of the cover plate with the tab spring blocking feature and springs shown in FIG. 2.
Figure 3A:
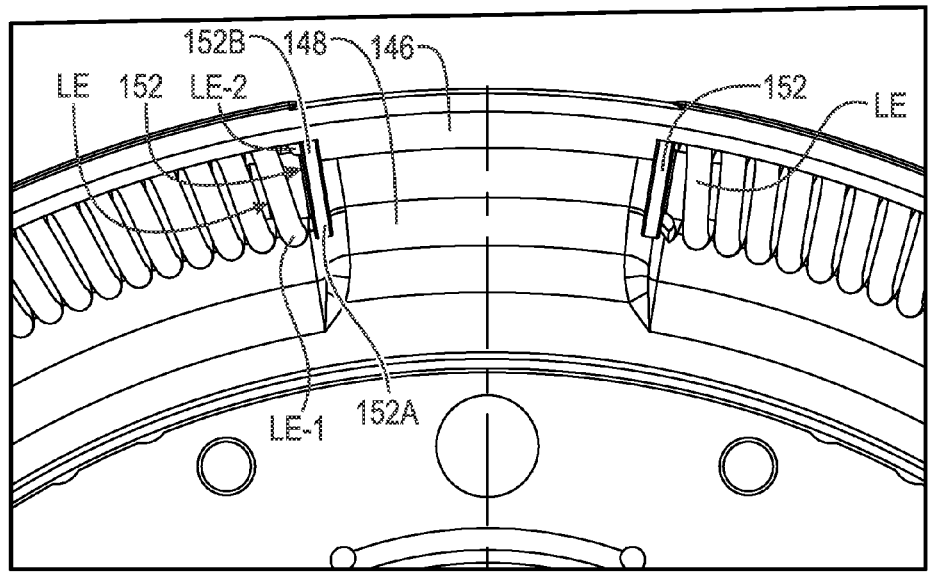
FIG. 3A is a detail of area 3A,3B of FIG. 3.
Figure 3B:
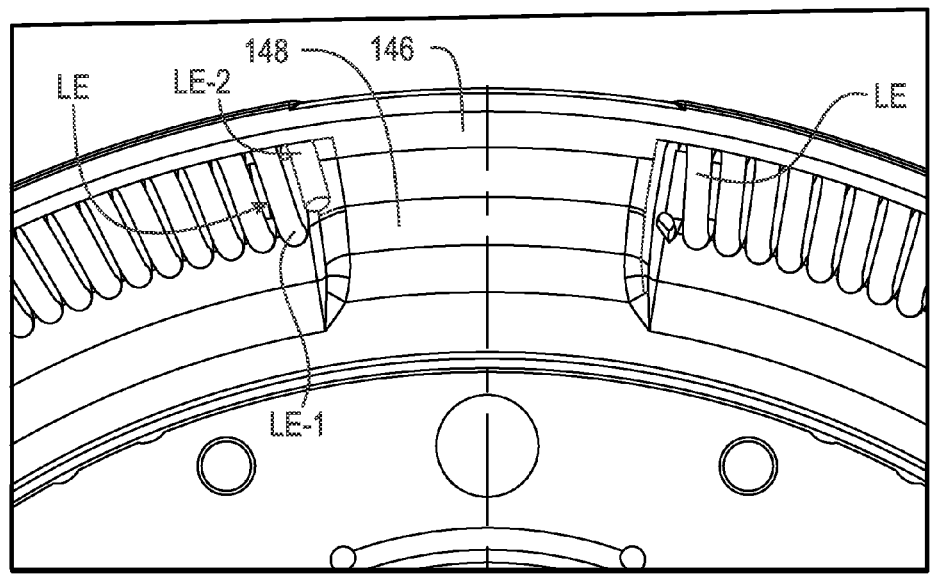
FIG. 3B is a detail of area 3A,3B of FIG. 3 with caps removed from the springs.

FIG. 3 is a front view of cover plate 126 with the tab spring blocking feature and springs 124 shown in FIG. 2. FIG. 3A is a detail area 3A,3B of FIG. 3. FIG. 3B is a detail of area 3A,3B of FIG. 3 with cap 152 removed from springs 124. Respective portions LE-1 of longitudinal ends LE of springs 124 are engaged with respective protrusions 148 and respective portions LE-2 of longitudinal ends LE of springs 124 are engaged with respective tab segments 146. As seen in FIG. 3A, ends LE-1 and LE-2 are engaged with protrusions 148 and tab segments 146, respectively, via portions 152A and 152B of caps 152, respectively. As seen in FIG. 3B, portions LE-1 and LE-2 are in direct contact with protrusions 148 and tab segments 146, respectively.

Figure 4A:
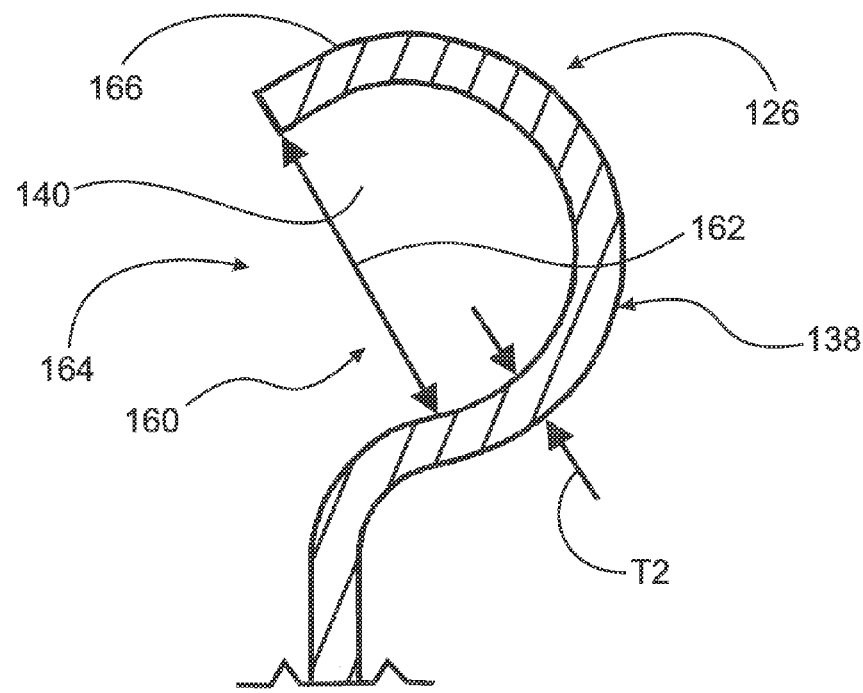
FIG. 4A is a cross-sectional view generally along line 4A-4A in FIG. 3 with the spring removed.

FIG. 4A is a cross-sectional view generally along line 4A-4A in FIG. 3 with the spring removed.

Figure 4B:
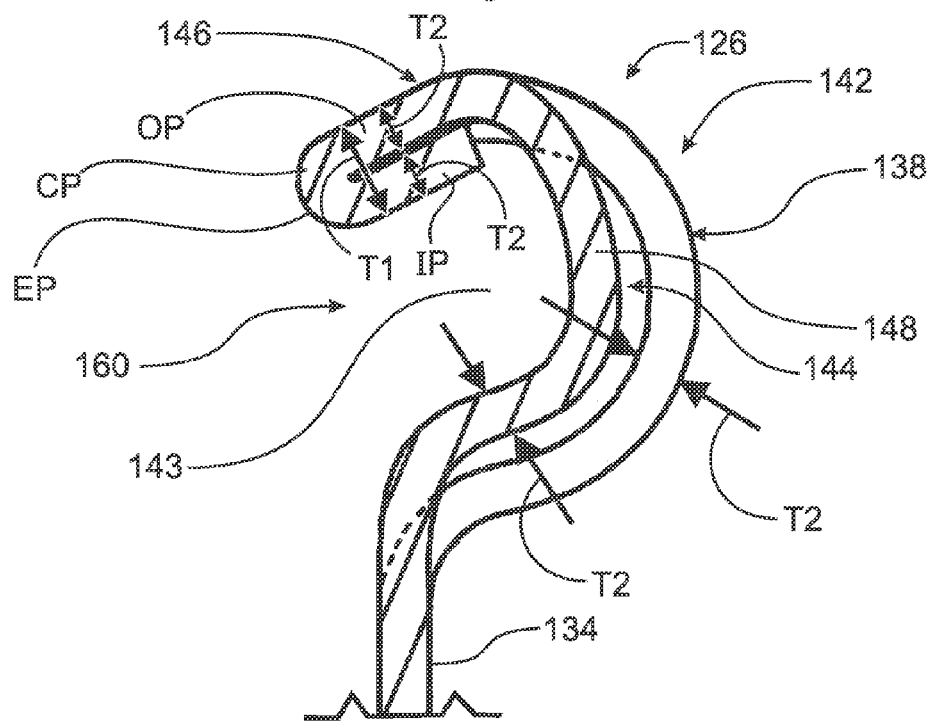
FIG. 4B is a cross-sectional view generally along line 4B-4B in FIG. 3 with the spring removed.

FIG. 4B is a cross-sectional view generally along line 4B-4B in FIG. 3 with the spring removed. The following should be viewed in light of FIGS. 2 through 4B. Cover plate 126 includes annular portion 134 and spring portion 136, located radially outward of the annular portion. The spring portion includes a plurality of spring retaining portions 138 forming respective spaces 140, as seen in FIG. 4A, and a plurality of spring blocking portions 142 with spaces 143, as seen in FIG. 4B. Each portion 142 includes protrusion segment 144 and tab segment 146. Segments 146 include respective portions EP of edge E of cover plate 126 and having a same thickness T1. Springs 124 are located in spaces 140 and have longitudinal ends LE with respect to circumferential line CL passing through respective longitudinal axes LA for springs 124.

Protrusion segments 144 have a same thickness T2, equal to about one half of T1 and include respective protrusions 148 extending toward CL. The longitudinal ends of springs 124 are engaged with the protrusions and the tab segments. The tab segments include outer portions OP having thickness T2 and continuous with the protrusions, and inner portions IP, radially inward of OP with respect to CL and also having thickness T2. The tab segments include curved portions CP, including portions EP, joining respective OPs and IPs. For example, the tab segment is formed by folded over portions of the material forming plate 126.

In an example embodiment, springs 124 include caps 152 at each longitudinal end and the caps are in contact with the protrusions and the tab segments.

Figure 5A:
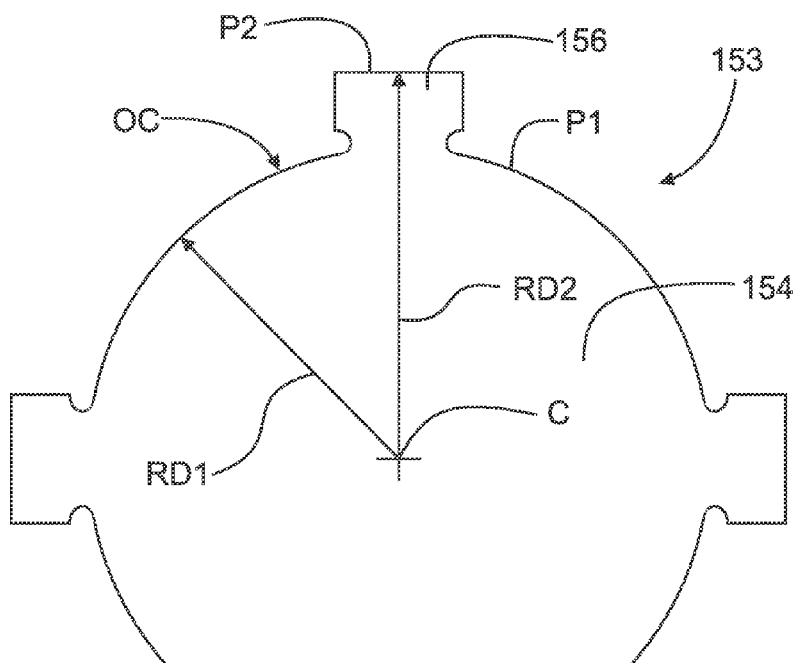
FIGS. 5A and 5B illustrate stages in fabrication of the cover plate shown in FIG. 3; and, FIG. 6 is a partial cross-sectional view of a prior art torque converter and vibration damper.
Figure 5B:
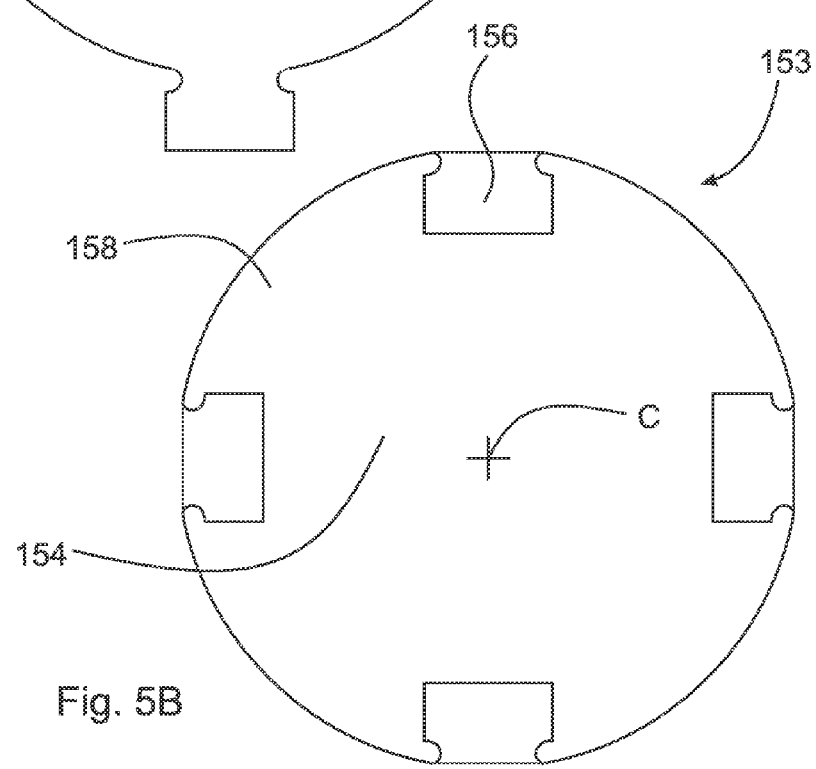
Figure 6:
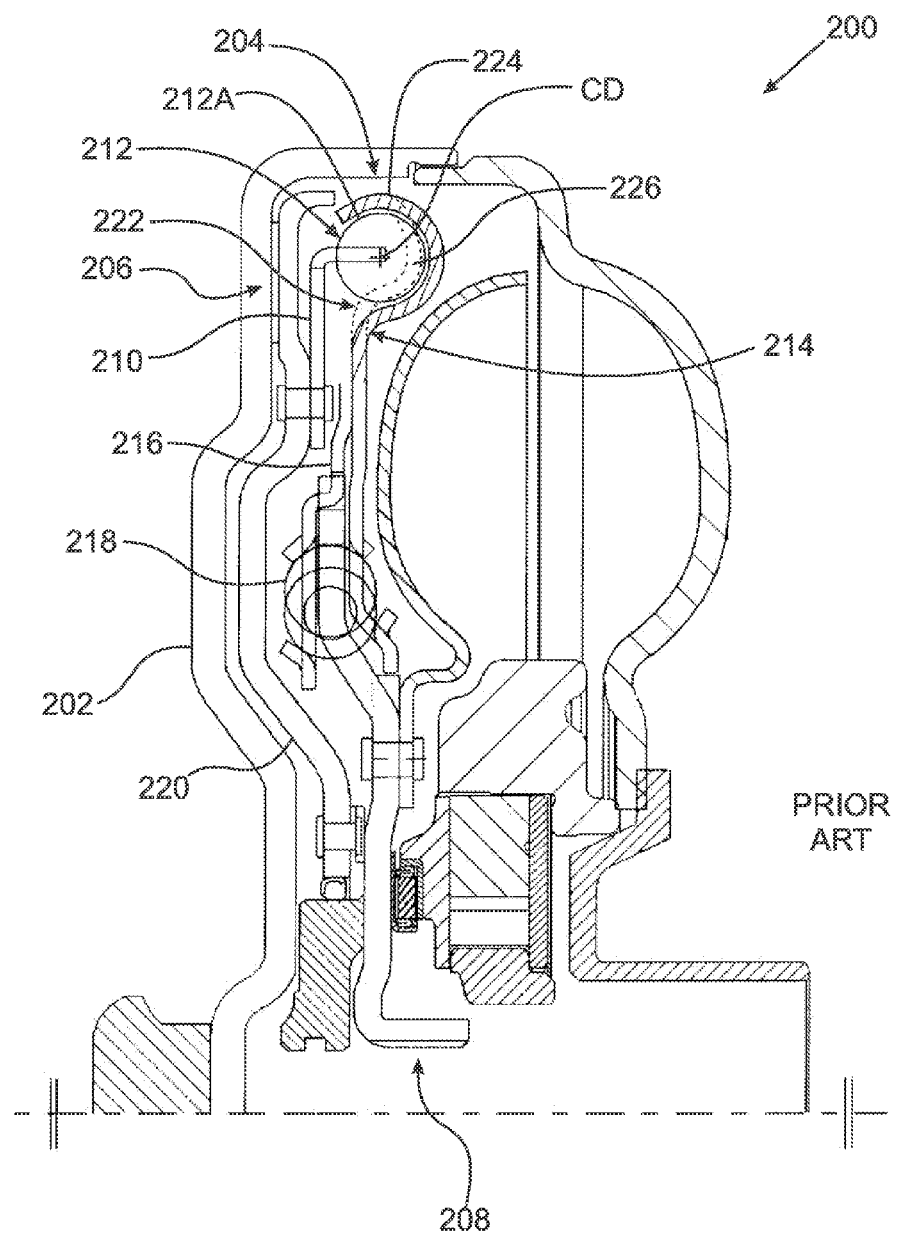

FIGS. 5A and 5B illustrate stages in fabrication of cover plate 126 shown in FIG. 3. The following should be viewed in light of FIGS. 2 through 5B. The following describes an example method of forming a vibration damper. As shown in FIG. 5A, a step stamps a sheet, for example, of steel, to form blank 153 for cover 126 for a vibration damper. The blank includes portion 154 extending from center C of the disc as far as radial distance RD1 from the center, forming portions P1 of outer circumference OC for the blank. The blank includes portions 156 extending as far as radial distance RD2, greater than radial distance RD1, from the center and forming portions P2 of the outer circumference. Another step, as shown in FIG. 5B, folds portions 156 to overlap portion 154. A further step compresses portions 156 against portion 154 to form tab segments, such as segments 146 shown in FIG. 4B. A step forms protrusions 148 between respective tab portions and the center of the blank. Another step curves radially outermost segment 158 of the blank to form spring blocking portions including protrusions 148 and tab portions 146 and circumferentially extending space 160 including spring retaining spaces 140 separated by respective spring blocking portions. A further step inserts springs 122 in the spring retaining spaces such that respective ends of the springs engage protrusions 148 and tab portions 146. A still further step rolls the outer circumference of the blank to trap springs 122 in the spring retaining spaces.

In an example embodiment, forming the tab portions includes forming the entire outer circumference of the blank at radial distance RD1. In an example embodiment, rolling the outer circumference of the blank includes forming a largest extent 162, between the outer circumference and portion 154 in a direction orthogonal to the outer circumference, for openings 164 for spring retaining spaces 140 to be more than diameter D of springs 122 to enable the springs to be inserted in spaces 140.

Advantageously, tab portions 146 increase the area of ends LE for springs 122 engaged with cover plate 126. This increased area reduces the likelihood of springs 122 buckling or popping out of spaces 140 when springs 122 are compressed. Further, the increase in engagement area for springs 122 is accomplished by modifying a part already used cover plate 126 by performing additional stamping and forming operations. Thus, a single plate 126 retains springs 122 via portions 166, axially restrains the springs via spring blocking portions 142, and increases the engagement area of the springs with the cover plate via tab segments 146, all without the use of additional components.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A vibration damper, comprising:
  a first cover plate including:
    an annular portion; and,
    a spring portion located radially outward of the annular portion and including:
      a plurality of spring retaining portions forming respective spaces; and,
      a plurality of spring blocking portions including:
        respective protrusion segments; and,
        respective tab segments including:
          respective end portions forming respective distal ends of the respective tab segments and having a first thickness; and,
          respective portions of an edge of the first cover plate, the respective portions of the edge having a same second thickness, substantially equal to one half the first thickness; and,
  a first plurality of springs at least partially located in the respective spaces, and having respective longitudinal ends with respect to a circumferential line passing through respective longitudinal axes for the plurality of springs, wherein:
    the first plurality of springs is arranged to transmit torque to the first cover plate;
    the respective protrusion segments have the same second thickness and include respective protrusions extending toward the circumferential line;
    respective first portions of the longitudinal ends of the first plurality of springs are in contact with the respective protrusions; and,
    respective second portions of the longitudinal ends of the first plurality of springs are in contact with the respective tab segments.

2. The vibration damper of claim 1, wherein the respective tab segments include:
  respective outer portions, having the second thickness, continuous with the respective protrusions;
  respective inner portions, radially inward of the outer portion with respect to the circumferential line, having the second thickness; and,
  respective curved portions, including the respective portions of the edge, joining the respective inner and outer portions.

3. The vibration damper of claim 1, further comprising:
  an output flange; and,
  a second plurality of springs engaged with first cover plate and the output flange.

4. The vibration damper of claim 1, further comprising:
  an input element engaged with the first plurality of springs and arranged to receive torque from a cover for a torque converter;
  an output flange; and,
  a second plurality of springs engaged with the first cover plate and the output flange.

5. A torque converter, comprising:
  a cover arranged to receive torque; and,
  a vibration damper including:
    a cover plate including:
      an annular portion; and,
      a spring portion located radially outward of the annular portion and including:
        a plurality of spring retaining portions forming respective spaces; and, a plurality of spring blocking portions including:
respective protrusion segments; and,
respective tab segments including:
respective end portions forming respective distal ends of the respective tab segments and having a first thickness; and,
respective portions of an edge of the cover plat, the respective portions of the edge having a same second thickness substantially equal to one half the first thickness;
a plurality of springs at least partially located in the respective spaces, and having respective longitudinal ends with respect to a circumferential line passing through respective longitudinal axes for the plurality of springs;
a plurality of caps, each cap located at a respective longitudinal end; and,
an output, wherein:
the cover plate is arranged to transmit torque to the output;
the respective protrusion segments have the same second thickness and include respective protrusions extending toward the circumferential line;
a respective first portion of said each cap is in contact with a respective protrusion; and,
a respective second portion of said each cap is in contact with a respective tab segment.

6. The torque converter of claim 5, wherein the respective tab segments include:
respective outer portions, having the second thickness, continuous with the respective protrusions;
respective inner portions, radially inward of the outer portion with respect to the circumferential line, having the second thickness; and,
respective curved portions, including the respective portions of the edge, joining the respective inner and outer portions.

7. The torque converter of claim 5, wherein:
the output includes a flange; and,
the vibration damper includes:
an input element engaged with the cover and the first plurality of springs; and,
a second plurality of springs engaged with the cover and the flange.

8. A vibration damper, comprising:
a first cover plate including:
an annular portion; and,
a spring portion located radially outward of the annular portion and including:
a plurality of spring retaining portions forming respective spaces; and,
a plurality of spring blocking portions including:
respective protrusion segments; and,
respective tab segments including:
respective end portions forming respective distal ends of the respective tab segments and having a first thickness; and,
respective portions of an edge of the first cover plate, the respective portions of the edge having a same second thickness substantially equal to one half the first thickness; and,
a first plurality of springs at least partially located in the respective spaces, and having respective longitudinal ends with respect to a circumferential line passing through respective longitudinal axes for the plurality of springs, wherein:
the first plurality of springs is arranged to transmit torque to the first cover plate;
the respective protrusion segments have the same second thickness and include respective protrusions extending toward the circumferential line; and,
wherein:
respective first portions of the longitudinal ends of the first plurality of springs are in contact with the respective protrusions; and,
respective second portions of the longitudinal ends of the first plurality of springs are in contact with the respective tab segments; or,
wherein:
the damper includes a plurality of caps, each cap located at a respective longitudinal end;
a respective first portion of said each cap is in contact with a respective protrusion; and,
a respective second portion of said each cap is in contact with a respective tab segment.

* * * * *